Patented Jan. 22, 1946

2,393,483

UNITED STATES PATENT OFFICE 2,393,483

1-HYDROXY-3-AMINO-3-METHYL BUTANE

Frank J. Soday, Baton Rouge, La., assignor to The United Gas Improvement Company, a corporation of Pennsylvania No Drawing. Application February 2, 1944, Serial No. 520,832

2 Claims. (Cl. 260—584)

The present invention relates to new compositions of matter and to methods for their preparation.

More particularly, this invention pertains to 1-hydroxy-3-amino-3-methyl butane and to methods for the preparation of this isoprene derivative.

This invention is based upon the discovery that this compound may be prepared in excellent yields through the reaction of aqueous ammonia with isoprene dihydrochloride.

It is an object of the present invention to provide a new compound namely, 1-hydroxy-3-amino-3-methyl butane and a process for the preparation thereof. Another object of this invention is to provide new compounds having utility in a number of chemical and related industries.

The preparation of 1-hydroxy-3-amino-3-methyl butane preferably is carried out by heating isoprene dihydrochloride with an aqueous ammonia solution.

The aqueous ammonia solution preferably contains from 15% to 85% ammonia, and more preferably from 25% to 65% ammonia.

The reaction preferably is carried out at superatmospheric pressures.

The reaction preferably is carried out at temperatures between 35° C. to 200° C. and more preferably between 50° C. and 100° C.

The invention may be more completely illustrated by means of the following example.

Example

A steel bomb was charged with 106 grams of isoprene dihydrochloride and 1100 cc. of a 34% aqueous ammonia solution and heated to a temperature of 80–82° C. for several days.

The resulting solution was evaporated, 200 cc. of water added to the residue, and the solution treated with 80 grams of sodium carbonate. The alkaline solution then was evaporated and extracted with 250 cc. of absolute ethyl alcohol.

The alcoholic extract was distilled, whereupon the isoprene hydroxy amine, having the following physical properties, was obtained:

Boiling point=71° C.@9 mm.
Density (d 20/4)=0.8380
Refractive index=1.4496

This product consists mainly of 1-hydroxy-3-amino-3-methyl butane. Other isoprene hydroxy amines boil mainly in the range of 60–80° C. @ 9 mm., have densities in the range of 0.82 to 0.85, and refractive indices in the range of 1.44 to 1.55.

The reaction may be illustrated by the following equations

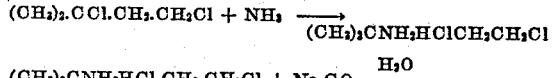

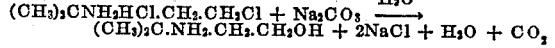

While products having specific structures and procedures for the preparation of such products have been particularly described, it is to be understood that these are by way of illustration. Therefore, changes, omissions, additions, substitutions, and/or modifications may be made within the scope of the claims without departing from the spirit of the invention.

I claim:

1. 1-hydroxy-3-amino-3-methyl butane.
2. A process for the preparation of 1-hydroxy-3-amino-3-methyl butane which comprises heating 1,3-dichloro-3-methyl butane at a temperature between 35° C. to 200° C. with an aqueous ammonia solution containing from 15% to 85% ammonia at superatmospheric pressure, contacting the resulting solution with an alkali under hydrolyzing conditions and recovering 1-hydroxy-3-amino-3-methyl butane from the reaction mass.

FRANK J. SODAY.